Roy W. Johnson
Donald R. Vaughan

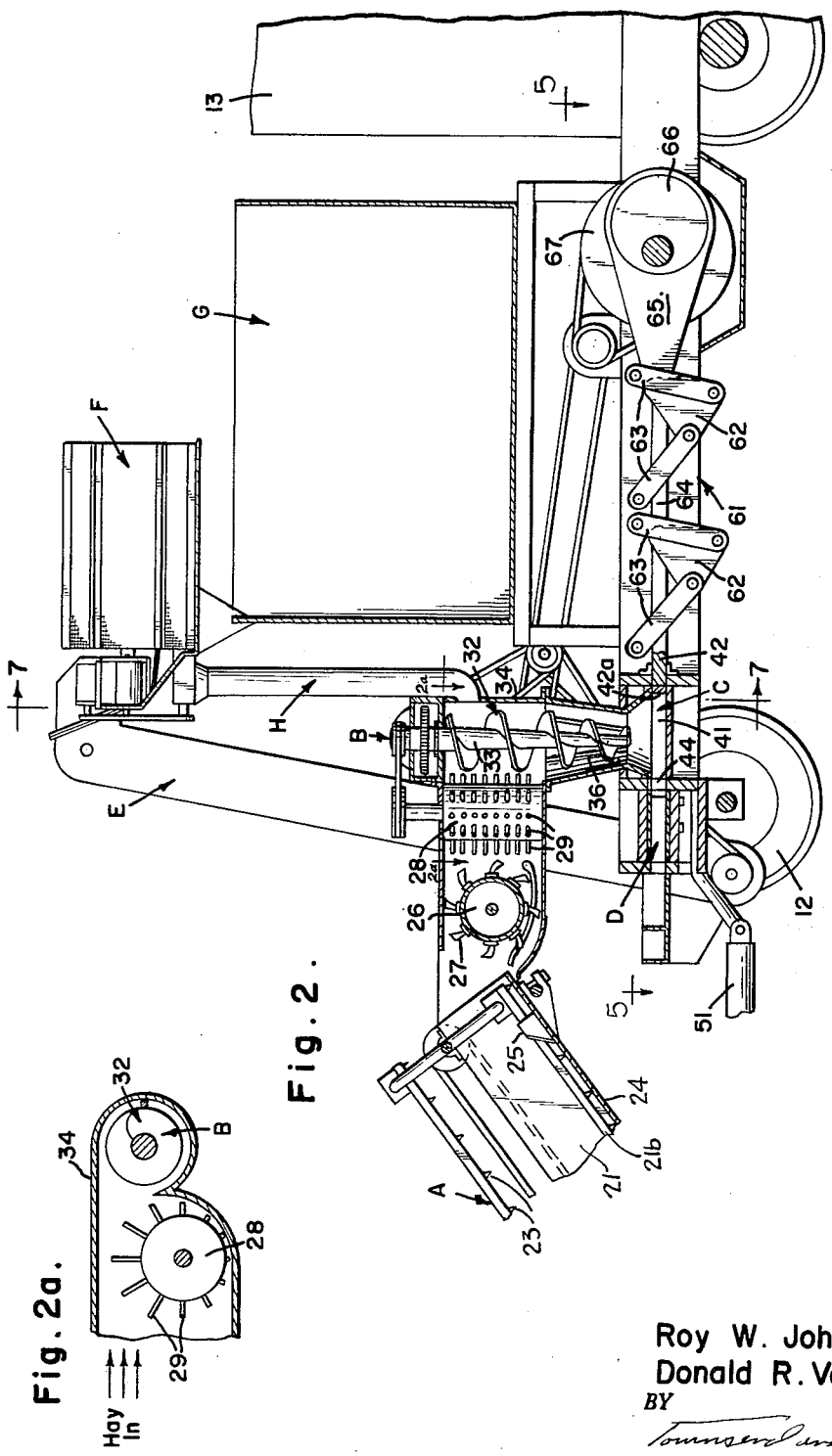

Nov. 23, 1965  R. W. JOHNSON ETAL  3,218,786
APPARATUS FOR GATHERING AND PELLETIZING NATURAL FORAGES
Filed Oct. 9, 1961  6 Sheets-Sheet 3
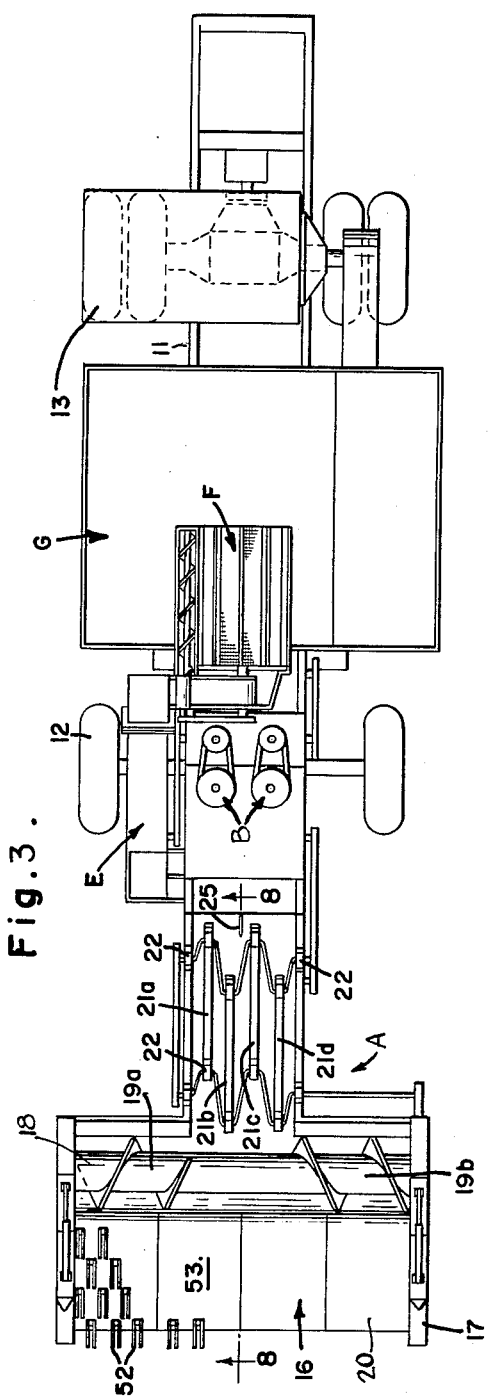
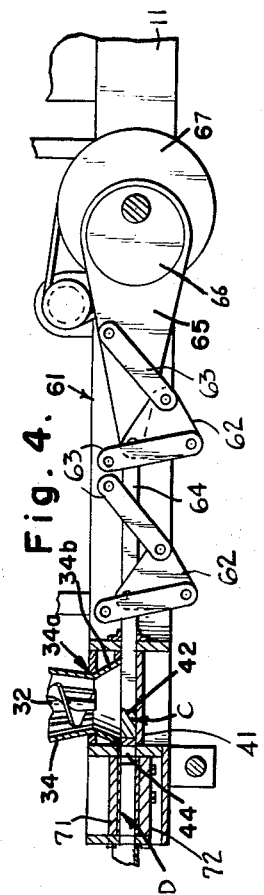
Roy W. Johnson
Donald R. Vaughan
BY
Townsend and Townsend
Attorneys Nov. 23, 1965    R. W. JOHNSON ETAL    3,218,786
APPARATUS FOR GATHERING AND PELLETIZING NATURAL FORAGES
Filed Oct. 9, 1961                            6 Sheets-Sheet 4
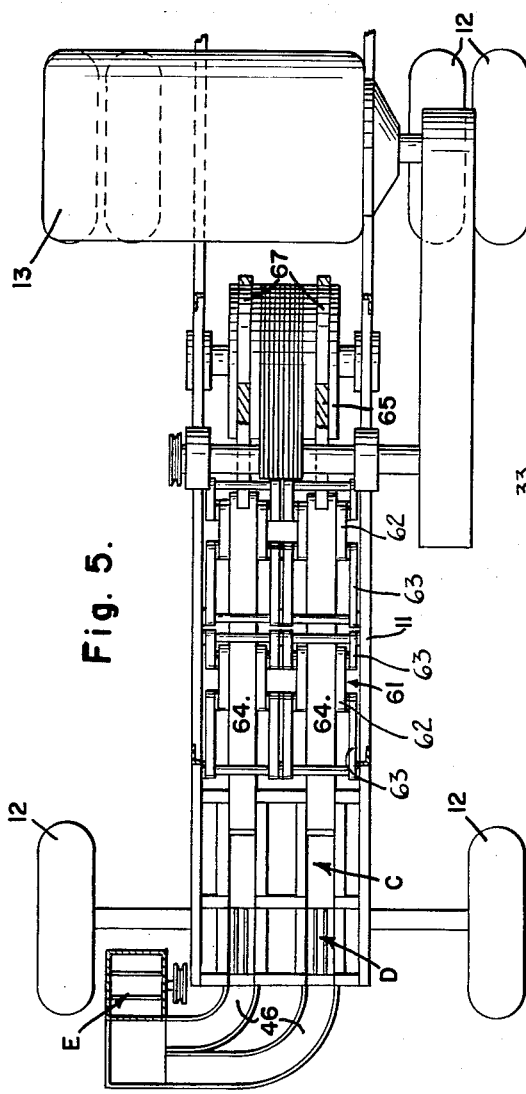
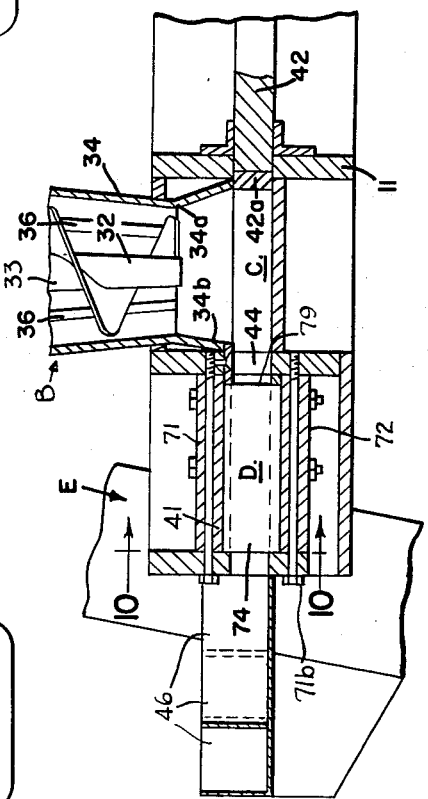
Roy W. Johnson
Donald R. Vaughan
BY
Townsend and Townsend
attorneys

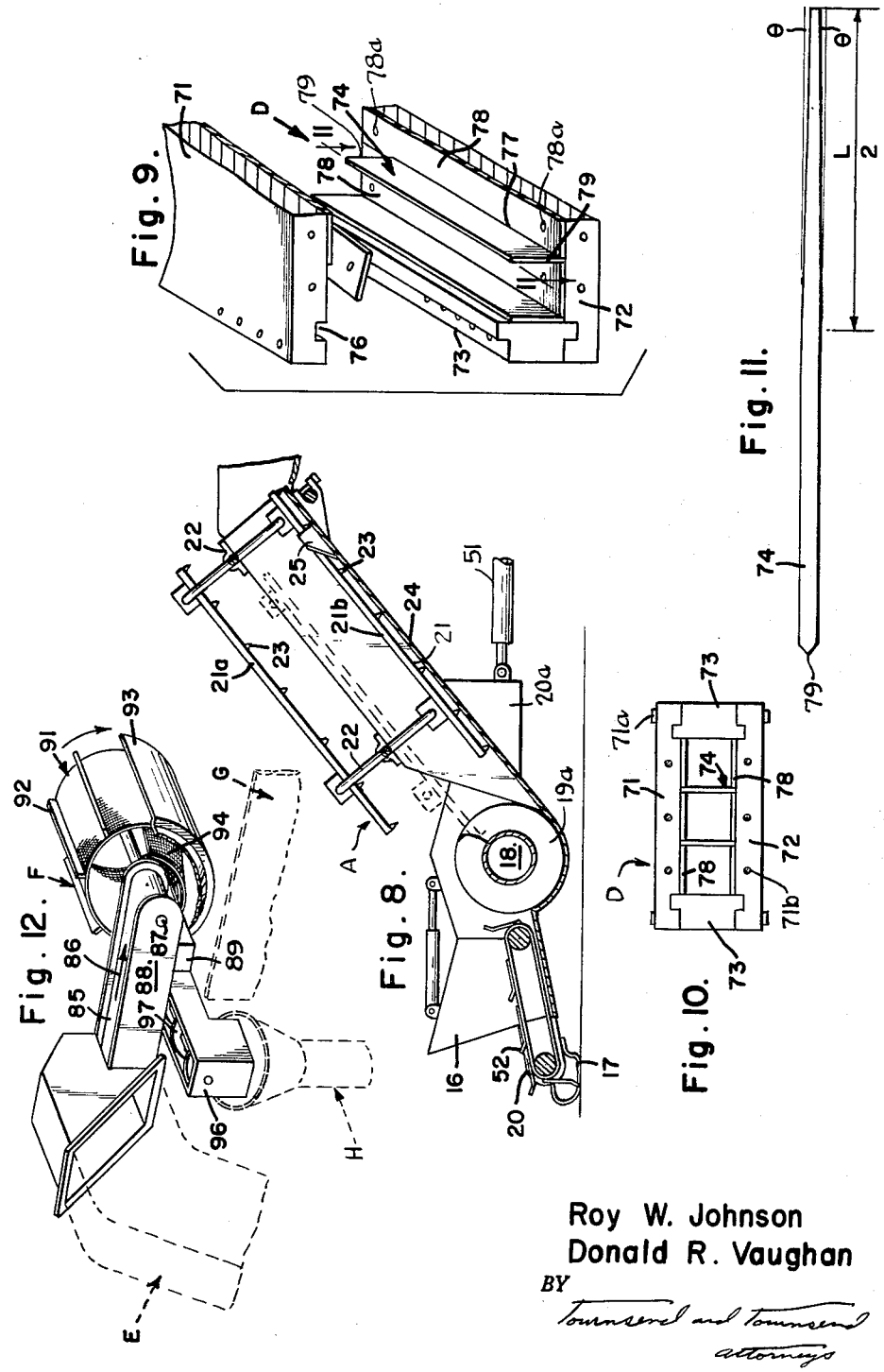

United States Patent Office 3,218,786
Patented Nov. 23, 1965

3,218,786
APPARATUS FOR GATHERING AND
PELLETIZING NATURAL FORAGES
Roy W. Johnson and Donald R. Vaughan, both of Woodland, Calif., assignors, by mesne assignments, to Deere & Company, Moline, Ill., a corporation of Delaware
Filed Oct. 9, 1961, Ser. No. 143,718
19 Claims. (Cl. 56—1)

This application is a continuation-in-part of our co-pending application Serial No. 801,253, filed on March 23, 1959, now Patent No. 3,090,182.

This invention relates to new and useful improvements in apparatus for pelletizing natural forages and particularly to apparatus for gathering and pelletizing field-cured hay or other forage without the addition of binders.

The present invention provides an end product that is small and compact and differs from prior pelletized livestock feed in that the forage is not initially ground or pulverized but instead includes the natural long fibers which have proven ideally suited for livestock feed. The pellets are formed of a predetermined density and of an optimum size for purposes of handling and feeding.

There have been numerous attempts in the past to compress livestock feed into pellets of one sort or another to reduce the storage capacity necessary for the loose forage and also to improve its taste characteristics. Most of these attempts have started by grinding or otherwise reducing the natural long fiber forages to powder or other comminuted form. Thereafter a binder, in many cases a sweetened binder, has been added to act as the glue for the powdered forage.

Though this has provided pelletized feed that has attained some commercial success, no one has heretofore successfully devised apparatus which will form a highly cohesive pelletized feed in which the long fibers of the forage are maintained and to which it is unnecessary to add artificial binders. The present invention, in common with the apparatus disclosed in our co-pending application identified above, for the first time provides a truly successful means by which long fiber forage can be pelletized without the addition of any binder and thereafter efficiently resist flaking during storage and handling—a problem common to those few pellets that have been formed heretofore without pulverizing the forage and/or adding a binder.

The present mobile apparatus is adapted to pick up hay or other natural forage after it has been cut field-cured and in a continuous operation turn out completed pellets of the long fiber forage as the mobile unit moves through the field. The apparatus includes a divergent bed scoop cooperating with an auger for directing the cut forage towards the center of the apparatus where it is picked up by a modified walker and moved to a point immediately adjacent a cutter. If the stalks are exceptionally tough, a conventional cutter is employed to cut the fibers and move them into contact with the fingers of a vertical finger drum which feeds them into the upper portion of an auger; otherwise, the cutter is unnecessary. Hay, alfalfa and most other forage does not have to be cut.

The tapered auger compresses the fibers and moves them in front of a high speed reciprocating ram which compresses charges of the precompressed long-fiber hay into a dense mass and successively forces this mass of highly compressed forage through a die cavity including dividers which further compress the forage and also divide it into reasonably sized pellets for feed purposes. It has been found that this combination of precompression, high impact, dense compression, and subsequent compression in the die chamber produces cohesive long-fiber pellets which are extremely palatable to livestock and are highly resistant to flaking or otherwise breaking apart during storage and handling.

While it is not certain why the particular apparatus performs its task so well, it is believed that the high-speed operation of the reciprocating ram creates high densities and temperatures in the head space between the extended stroke of the ram and the die cavity which cause the natural sugars in the hay to caramelize and act as a highly efficient and tasty binder for the product. Be this as it may, it has been found that by obtaining densities in the neighborhood of 42 pounds per cubic foot it is possible to obtain the salutory results of the present invention. In order to provide this density and at the same time continuously operate the apparatus it has been necessary to carefully design the precompression auger, the support means and head space chamber for the reciprocating ram and the interior of the die cavity.

Broadly speaking, the principal object of the present invention is to produce high-density pellets without using binders or other artificial adhesives.

Another object is to produce a pelletized field-cured hay or other fodder product having a desired density, long fibers, good flaking characteristics and an attractive taste for livestock.

Still another object is to provide a pelletized product as set forth above with apparatus which is simple to manufacture, economical to operate and easy to repair.

A feature of the invention pertains to the auger type precompressing feed which operates in a housing of diminishing cross section to provide a positive flow of fodder and at the same time to precompress it within selected limits. The housing is further provided with ribs parallel to the longitudinal axis of the auger to prevent the forage from rotating with the auger as well as to prevent retrogression or upward movement of the forage back towards the finger drum supplying it with raw material. The retrogression and blocking of the auger enclosure is further prevented by a divergent flare at the bottom of the housing intermediate the housing and the cylinder through which the reciprocating ram is moved.

Another feature of the invention pertains to the high speed reciprocating ram which operates in the range between 250 and 600 revolutions per minute to engage successive charges of precompressed hay and form a dense cohesive mass in the head space intermediate the die cavity and its fully extended position.

Yet another feature of the invention pertains to means for adjusting the size of the head space to vary the density of the pellets produced. This is varied largely depending on the particular forage being processed although there is no reason why the density of a specific product cannot be varied as well. This is also in part determined by the moisture content of the forage being pelletized. If the moisture content is high, a greater head space is needed and a less dense product is obtained than if the moisture content is low. While the apparatus operates satisfactorily with moisture contents between approximately 5 and 25%, it is ideally operated if the moisture content is approximately 12%. The resulting pellets are approximately 11% water by weight.

Still another feature of the invention pertains to the tapered surfaces on the divider on the die cavity which prevents plugging or clogging of the apparatus if operation is interrupted for any period of time. When the die cavity temperature gradient is lowered due to interruption or discontinuance of operation for any period of time, the moisture in the forage tends to enlarge its volume and in many cases causes it to seize or plug the die cavities. However, we have discovered that this can be effectively avoided if a taper, ideally between 0.5 and 0.25% per foot of length of the die cavity, is used on both sides of the divider blade for a sufficient length. This coupled with depositing a 1 to 2 mil thick industrial plating of chromium on the blades effectively eliminates the problem.

Yet another broad feature of the invention pertains to the apparatus for picking up cut hay in the field and delivering it to the precompressing auger. Whereas the previous embodiment of this invention used a horizontal finger drum in part to deliver cut hay to the auger, it has been found that the distribution provided by a vertical drum in cooperation with the auger is superior and prevents non-uniform feeding of the auger.

Yet another broad feature of the invention pertains to means for detecting trash iron in the cut hay and recycling any loose flakes of forage to the top of the auger as the pellets are deposited in a storage bin on the portable or mobile apparatus.

A narrower feature of the invention pertains to the means by which the high-speed reciprocating ram is supported for movement on the horizontal ram adjacent the head space chamber in the apparatus. The high-speed operation of the ram generates a difficult problem for the support of the ram and the present double pivot support linkage provides adequate support with minimum vibration and wear.

These and other objects, advantages and features of the present invention will be more fully understood when the following detailed description is read with reference to the drawings, in which:

FIG. 2 is an enlarged partial side section with certain parts omitted or broken away to more clearly depict the cooperation of the translating, compressing and ram supporting parts of the present invention;

FIG. 2a is a partial section taken along line 2a—2a of FIG. 2 to illustrate the cooperation of the finger drum and auger;

FIG. 3 is a plan view of the portable unit illustrated in FIG. 1;

FIG. 4 is an enlarged and partial side view of the ram supporting and actuating means;

FIG. 5 is a section taken along the longitudinal line 5—5 of FIG. 2;

FIG. 6 is an enlarged side section illustrating the construction of the lower part of the auger guide intermediate the auger and ram;

FIG. 8 is an enlarged section along line 8—8 of FIG. 3 illustrating the construction of the modified walker for moving the forage to the cutter and vertical finger drum;

FIG. 9 is an enlarged exploded partial perspective of the die assembly and separator blades employed in the exemplary embodiment of the invention;

FIG. 10 is a section taken along line 10—10 of FIG. 6 looking towards the front of the pelletizing apparatus of the present invention to show the die mechanism;

FIG. 11 is an enlarged section taken along line 11—11 of FIG. 9 to illustrate the front to rear taper of the separator blades of the exemplary die cavity; and FIG. 12 is an enlarged perspective of the fine and trash iron removal apparatus of the present invention with cooperating parts shown by dotted lines.

Figure 1:
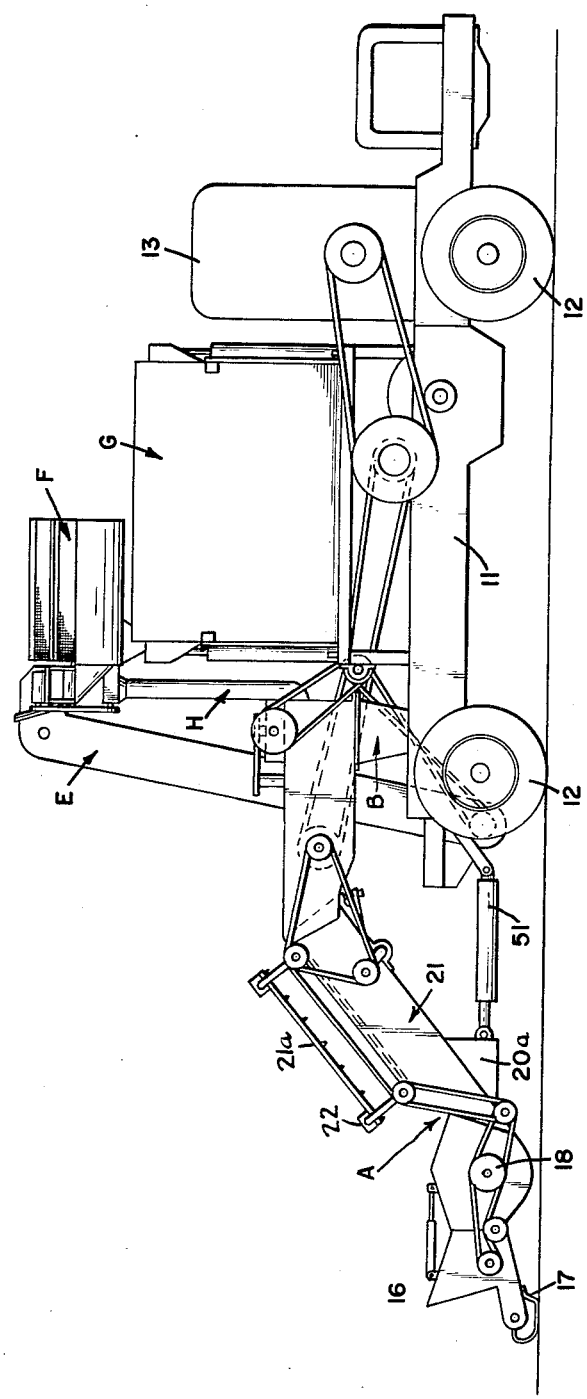
FIG. 1 is a side view of the improved portable pelletizing apparatus constituting the present invention with certain parts omitted to more clearly illustrate the cooperative relationship of principal parts.

The drawings illustrate the mobile unit as having two pelletizing assemblies, that is, two sets of the auger precompression and ram compression mechanisms and dies. Though a single pick-up and translating device is used for both, the hay is split and directed to the individual pelletizing assemblies. The assemblies are identical except for the pitch of the augers and the fact that reciprocation of the rams for the units is alternated. The mobile unit will be described hereinafter for a single pelletizing assembly although it should be understood that the pair of assemblies are mounted on the illustrative embodiment of the mobile apparatus. It should also be noted that the belt or other drives for most of the rotating parts, though disclosed in the various drawings, are not identified specifically. It should be apparent that the parts may be rotated by connection to a single source of power such as 13. Where it is important that the mechanical interconnections be explained in detail, it will be done. Otherwise it will be assumed that the power takeoffs are conventional and obvious.

The basic operation of this mobile pelletizing apparatus is along the lines described in our previous application. Cut hay is picked up from a field and moved to a position adjacent to the vertical tapered auger which precompresses the hay and delivers it to a high-speed reciprocating ram. The ram successively compresses charges of the precompressed hay which are thereafter forced through a multi-section die. The latter further compresses the hay. While the present apparatus has features in common with our earlier apparatus, certain components have been improved and/or changed to produce more effectively excellent grade pelletized products.

Hay and most other forages when they are freshly cut have a moisture content in excess of seventy percent by weight. The hay is normally left in the field until the moisture content falls between twelve and eighteen percent so that hay baling machines can handle it. The present invention, however, can pelletize hay with a moisture content range between six and twenty-five percent.

Looking to the figures, the hay pelletizing apparatus generally includes pick-up and translating apparatus A, the auger-type precompression mechanism B, ram compression apparatus C, a multi-section die D, a conveyor chute E for the pelletized product, fine and trash iron removal apparatus F, and a storage bin G. All of the apparatus is supported on a frame 11 which in turn is supported for mobile operation by wheels 12. Power is provided for moving the frame and the apparatus thereon through a diesel engine or other source of power 13.

As the mobile apparatus is moved through a field after hay or any other type of forage has been cut and left lying on the ground, the pick-up and translating apparatus A picks up the forage and delivers it to the cutter or the vertical finger drum for movement into the auger. The auger mechanism B precompresses the hay and feeds it into the ram mechanism C which compresses the successive charges of the hay further and, in doing so, forces them through the die D. As the pellets emerge from the die D, they are conveyed by the conveyor E to the fine and trash iron removal apparatus F. Here the pellets are sifted to remove loose particles or flakings of forage and also any pellets having trash iron embedded therein before the uncontaminated ones drop into the storage bin G. When the storage bin G is full, it can be pivoted to dump the pellets into a truck and pelletizing operations continued. The apparatus exemplarily disclosed can pelletize three to five tons of forage an hour, including dead time for returning from one side of a field to another to re-position the apparatus.

The pick-up and translating apparatus A includes a finger belt conveyor 16 (of conventional design) which follows the contour of the ground by way of support member 17 to pick up the cut hay and deposit it on a rotating belt 20 constituting part of the finger belt conveyor 16. The belt 20 carries the hay to a horizontal screw 18 which has oppositely oriented blade flights 19a and 19b between its ends and its center which move the hay toward the center part of the pelletizing apparatus and to the input of a modified walker 21.

The modified walker 21 includes a plurality of longitudinally oriented bar members 21a–b which are reciprocated by cranks 22 at their forward and rearward ends.

As the walker 21 operates, a series of vertically depending fingers 23 on the bars 21a–b engage the hay on a bed 24 of the walker 21 to move it towards a horizontally oriented thresher or cutter 26.

As the hay is moved along the bed 24, it is moved into the path of blades 27 on the cutter 26 which cut extremely long or heavy stalks if certain forages are being processed. In most cases, the cutter 26 may be omitted. For example, it is not needed to properly process alfalfa, hay and similar types of small stalk natural forage.

From the cutter 26 or the modified walker 21 (if the cutter 26 is omitted), the hay is moved into the path of a vertical finger drum 28 which employs a plurality of radially movable horizontally oriented fingers 29 spaced peripherally about its surface in vertical arrays (FIGS. 2 and 2a). The fingers 29 on drum 28 move radially in and out so that they engage hay on one side and deliver it in an unbunched condition to the precompression auger mechanism B and are retracted on the other side. The mechanism for extending and contracting the fingers 29 may be of any well-known construction, such as in the U.S. patent to Oehler 2,529,180.

The auger mechanism B includes the vertically and rotatably supported auger 32 having a tapered shank 33 and supported in the external housing 34 which is cylindrical in cross-section and similarly tapered towards its lower end. This mechanism precompresses quantities of hay scraped from the housing 34 by the bar 35 as the auger rotates and moves hay downwardly to a position adjacent to the ram mechanism C. A plurality of vertically oriented ribs 36 are spaced peripherally about the lower interior of the housing 34 to prevent the hay from rotating as the auger rotates. They also prevent the hay from retrogressing upwardly towards the finger drum 28.

The auger housing 34 tapers at its lower end to a point shortly above the entrance into a cylinder or ram housing 41 and forwardly of the position of a ram 42 in the ram compression mechanism C. Thereafter, the housing 34 flares outwardly at 34b to facilitate movement of the hay from the precompression auger B into the ram mechanism C. This change of the taper on housing 34 from an inwardly inclined taper to an outwardly expanding one (at plane 34a) can be seen most clearly in FIG. 6. This reverse taper not only permits the material to flow freely past the minimum cross section at 34a but also helps prevent retrogression of hay upwardly in the auger housing 34 back towards the finger drum 28.

As the hay is compressed by rotation of the auger 32 it is moved into the cylinder 41 ahead of the reciprocating ram 42 (when the latter is in its rearmost position to the right of FIG. 2 of the drawings). As the ram 42 approaches its top dead center position, illustrated in FIG. 4, charges of hay in the housing 41 are compacted. The space between the forwardmost position of the ram 42 (FIG. 4) and the beginning of the die D is a head space 44 which can be varied by shims placed on the forward part of the ram 42. This adjustable feature is desirable when pellets are formed of different natural forages or when moisture contents are different. The shims (not shown) can be inserted between a cap 42a and the ram 42 as in above Patent 3,090,182. This permits control of the density of the product within selected limits so that a desired compaction may be obtained even though the moisture content of the forage is variable.

Each subsequent charge of hay deposited in the cylinder 41 ahead of the ram 42 is compacted into the head space 44 and moves the preceding compressed charge of hay through the die cavities of the die mechanism D. The die cavities, as will be explained in more detail below, further compress the charges of hay and also split them into a plurality of small bite-size pieces that are better suited for livestock feed. In the exemplary apparatus, the pellets are approximately one and one-half inch cubes.

The pellets as they emerge from the die mechanism D upon successive operations of the ram 42 are moved along a guide channel 46 (FIG. 5) to the lower part of the conveyor E. This conveyor transports them to the top of the fine removal apparatus F which, in turn, deposits them in the storage bin G.

Now that the general features of the apparatus have been considered, certain parts may be considered in more detail. Looking first to the apparatus A for moving hay from the field to a position adjacent the auger mechanism B, it can be seen by reference to FIG. 1 that the modified walker 21, finger belt conveyor 16 and the horizontal screw 18 are supported on the common frame member 20a which is attached to one end of a hydraulic or similarly operated cylinder 51 which is, in turn, attached to the forward end of main frame 11. It is operated (by means not shown) to adjust the relative position of the pick-up apparatus A in accordance with the contours of the field in which the mobile apparatus is operating. The finger belt conveyor 16 includes a plurality of wire fingers 52 supported on the belt 20 which engage the cut hay in the field and move it into the flights 19a and 19b of the horizontally oriented auger 18. As noted, the flights on auger 18 are oppositely arranged so as to move the hay towards the center of the pelletizing apparatus. There the modified walker 21 moves the hay into a position adjacent the vertical finger drum 28. A knife blade 25 (FIG. 3) is set along the bed 24 of the modified walker 21 to separate the hay being moved by the walker into two sections which are roughly equal and which are directed to the individual pelletizing assemblies on the mobile unit.

The precompression or auger mechanism B can now be considered in more detail. The vertically and rotatably supported auger 32 has the tapered shaft 33 which decreases in cross section towards its lower end at plane 34a as previously stated. The end of the tapered auger terminates at plane 34a and the outward flare 34b on the lower end of housing 34, as particularly seen in FIG. 6, provides easy passage for precompressed charges of hay into the housing 41. The clearance between the auger and the housing is approximately one-half inch to prevent jamming of hay between the auger and the side of the housing 34. The vertical ribs 36 act to prevent the rotation of hay with the auger and therefore prevent retrogression or other undesired effects as the auger precompresses charges of hay and delivers them into the housing chamber or cylinder 41 in which the ram 42 reciprocates at a high rate of speed.

A suitable auger 32 has been constructed. It is approximately two feet long and terminates about three inches above the bottom of the outward flare or flange 34b and with the outermost flaring portion of flange 34b being approximately 10% greater than the point of minimum cross section at plane 34a. While the bottom cross section of 34b can vary, it is desirable to have a cross section identical to and communicating with the guide housing or cylinder 41.

In the exemplary embodiment of the present invention, although it is not critical, each ram 42 is rectangular, as is its housing 41, and is dimensioned to move slidably along the walls of its housing to and from a point which lies behind the leading edge of the die cavity D to define the head space 44.

The ram 42 is driven by the source of power 13 by a connecting rod 64 through a connecting linkage 61. The linkage 61, illustrated particularly in FIGS. 2 and 4, includes pairs of triangular plates 62 which are supported on opposite sides of the rod 64 and connected at two of their corners to links 63 which are in turn attached to the frame 11 on each side of the rod 64. The remaining corners are connected at longitudinally spaced apart points to the connecting rod 64 and on opposite sides thereof. This arrangement efficiently maintains rod 64 in line with the longitudinal axis of cylinder 41. The rearward part of rod 64 is pivotally connected to a member 65 which is rotatably mounted on an eccentric bearing 66 carried by a driving wheel 67. The latter is driven by the power source 13 by way of appropriate belts. As the driving wheel 67 rotates, member 65 causes rod 64 to reciprocate. The double in-line motion linkage 61 which supports the ram 42 for high-speed reciprocation in the housing 41 has been found particularly useful because it has reduced the wear on the ram and on the internal surfaces of the die cavity D—both of which have been problems from the standpoint of maintenance and replacement.

It is preferable that the ram be operated at a rate in excess of 250 revolutions or thrusts per minute to provide the high impact pressures necessary to pelletize the forage at densities exceeding 35 to 40 pounds per cubic foot where the die cavity length is as set forth below. Within the range of 250 to 600 r.p.m. it is possible to form sufficiently dense pellets and 425 r.p.m. has been found to work well in practice. As these pellets are further compressed in the die cavities, it is believed that the leaves and stalks rupture and the sugars therein are caramelized by the high temperatures in the die to bind the leaves and stalks into a cohesive pellet. This caramelization of the sugars in the natural forage not only provides a binder for the pellets and therefore makes them quite resistant to flaking and other deterioration during handling and storage but also increases the palatableness of the pellets.

Turning to the construction of the die mechanism D, FIGS. 9–11 particularly illustrate a knock-down construction to facilitate repair and replacement of parts. Each die comprises a top plate 71, a bottom plate 72, and two side members 73. These members are held together by a series of bolts 71a which depend through the top and bottom plates 71 and 72 and side plates 73 to form a sturdy but easily dismantled die. The interior sides of the top and bottom plates 71 and 72 have longitudinal channels 76 formed adjacent their outer ends to engage shoulders on the sides 73. The facing surfaces of top and bottom plates 71 and 72 also each have at least a pair of longitudinal slots 77 formed parallel to the sides 73 which receive divider blades 74. The die mechanism is secured to the ram housing by long cap screws 71b.

In the interests of clarity, it should be understood that, as respects the die, "front" means its inlet end and "rear" means its outlet end; although, these are reversed as respects the direction of travel of the machine. On this basis, then, the taper of the blade is from front (inlet) to rear (outlet) so that the thickness of the blade is less at its rear or outlet end, and this means that the cross-sectional area of each die cavity is greater at its rear or outlet end than at its front or inlet end. This is just the opposite of the "choke" or "throttling" principle so common to the art.

The divider blades 74 are symmetrically tapered on each side from the front toward the rear of the die mechanism D (into the page as the die is illustrated in FIG. 9) to prevent seizing or adhering of the pellets thereto. The upper and lower sides of the divider blades 74 fit in slots 77 which are formed in the top and bottom plates 71 and 72. A series of wear plates 78 are secured to the interior surfaces of the top, bottom and side plates 71, 72 and 73 by countersunk flat-head screws 78a. The wear plates are generally formed of tempered steel and, ideally, are chromium plated to reduce wear.

The wear plates attached to the plates 71 and 72 have longitudinal cut-outs along their sides which overlie slots 77 to permit the divider blades 74 to be inserted therethrough.

Each divider blade 74 is milled to round the corners in the assembled die to reduce the friction as hay is forced through the die and also to prevent its build-up in the corners, which build-up could plug the die. However, the front ends of the dividers 74 are honed to a knife edge 79 to efficiently split impacted charges of hay into the plurality of pellets desired. It is believed that the compressed hay as it is further compressed upon contacting the knife edges of divider blades 74 virtually flows as a liquid as the petioles of the forage are ruptured and release the natural sugars.

The assembled die mechanism D is illustrated in FIG. 10. Beyond this, FIG. 11 is an enlarged top view of divider blade 74 showing the symmetrical taper on both sides from the front to rear of the blade. The blade in the exemplary embodiment illustrated is approximately 14 inches long and has a 2½ mil per foot taper on each side which is illustrated by the tapered sides at angle $\theta$ in FIG. 11. If angle $\theta$ for each foot of length of the blade exceeds 5 mils, the resulting pellets will not be dense enough to provide the necessary cohesiveness required, whereas, if angle $\theta$ is less than 2½ mils per foot, the amount of expansion permitted is not sufficient to prevent seizure, at least in particularly adverse situations. However, as long as the taper equals or exceeds one-half the length of the exemplary blade, as shown at $L/2$ in FIG. 11, satisfactory pellets may be formed without seizing, if the speed of the ram is high enough. If the rate of the ram's operation is reduced below the 250 r.p.m. figure, then it is necessary to lengthen the die cavity so that a reasonably dense pellet can be formed. But even so, optimum pellets cannot be produced at ram head rates much below 250 r.p.m.

Further, all interior surfaces of the blade 74 and the liners 78 are plated with a one to three mil thickness of chromium to reduce the possibility of the highly compressed hay seizing the interior surfaces of the die and plugging it.

Whereas the earlier die construction, as described in the application identified above, made it desirable to prevent seizing by providing a means for expanding the after chamber of the die, tapering the blades in the present die cavity and chrome plating them has overcome the danger even during extended shut-downs where the die temperature approaches ambient temperature.

As stated earlier, it is believed that the high impact pressures generated by the ram 42 cause the leafstalks of the highly compressed fibers to rupture as the blades or separators 74 further compress the forage. This rupturing of the fibers releases the sugars in the forage and it is believed that caramelization of these sugars provides the distinctive characteristics of the present product. This caramelization is particularly noticeable in the color of the product as well as in its odor. No other pelletized product to date has been able to approximate the dense pellet produced by the apparatus described herein, and it is believed that the very high impact pressures are responsible inasmuch as they exceed over 4,000 pounds per square inch and in some cases in localized areas are probably upward to as much as 8,000 pounds per square inch.

Looking more particularly to the means for transporting the finished pellets from the dies D into the storage bin G, it can be seen that the finished pellets, after they have been split and separated, move along the discharge chutes 46 to the lower flight of the belt conveyor E. The belt conveyor E is a conventional one having a number of horizontally supported projecting members or flights (not illustrated) which are rotated under the finished pellets by the belt and carry them towards the top of the conveyor E. They are deposited in the trash iron and fine removal apparatus F. As will be appreciated, forage picked up in a field often has trash iron or other foreign objects in it. This apparatus F removes the pellets that contain trash iron.

The fine and trash iron removal apparatus F is illustrated in perspective in FIG. 12. The conveyor E carries pellets from the discharge chute 46 up to the removal apparatus which includes an endless belt conveyor 85 supported for rotation in the direction of arrow 86 in a housing 88 which terminates adjacent to the outermost drive roller 87 of the belt conveyor 85. Adjacent to the discharge end of belt conveyor 85, is a drive roller 87 rotatably supporting a cylindrical drum 91 having an open mesh surface and including a plurality of spaced apart longitudinal blades 92. A half cylindrical housing 93 is supported beneath the drum 91 and the blades 92 move against the interior surface of this housing to transfer any particles of forage from the housing to an open ended discharge chute H connected to the top part of at least one of the precompression auger mechanisms B (see particularly FIG. 2 in this connection).

As pellets move along belt conveyor 85, if they have no trash iron in them they fall into a conically shaped part 94 stationarily supported interiorly of the drum 91. As they slide and roll toward the discharge end of the drum (away from the drive roller 87 in FIG. 12), because of the slope of the member 94, all loose particles of forage or flakings fall through the open-mesh screen on the drum 91 and into the trough 93. After the fines have been removed the pellets are discharged from drum 91 into the storage bin G.

A fine discharge chute 96 is supported approximately parallel to the rotating axis of the drum 91 and at the inward lip of the trough or housing 93 to receive the fines as they are swept along the interior surface of the trough by the blades 92. An auger 97 is rotatably supported in the discharge chute 96 to move the fines into the open part of the discharge chute H, whence they fall by gravity into the auger mechanism B.

If any of the pellets carried by conveyor belt 85 have trash iron compressed in them, driving roller 87 prevents their reaching the storage bin G. Roller 87 is formed of a magnetized material and holds pellets with iron embedded therein against the belt 85 as the belt moves beneath the roller 87 to return to its starting position and carries the pellets to a discharge chute 89 communicating with the lower part of the housing 88. The pellets with trash iron in them may be collected from the discharge chute 89 and disposed of or otherwise handled at the end of a run.

After the storage bin G is filled with pellets, means are provided to pivot the bin about an axis longitudinal to the mobile apparatus to dump the pellets into a truck or other conveying device for further processing. The discharging means can be seen particularly well in FIG. 7. The fine and trash iron removal apparatus F is mounted on the storage bin G and pivots with the storage bin as it is emptied. The storage bin G is pivotally mounted on the frame 11 at 101 and a pair of hydraulic pistons 102 are connected between the frame 11 and the forward and rear sides of the bin G at points 103. By actuating the hydraulic cylinders 102 (by means not shown) the bin G is pivoted about point 101 to the position 104 shown in dotted line in FIG. 7. As can be seen therein, the removal apparatus F is pivoted with the bin G and is in position 105 when the bin discharges pellets.

Figure 7:
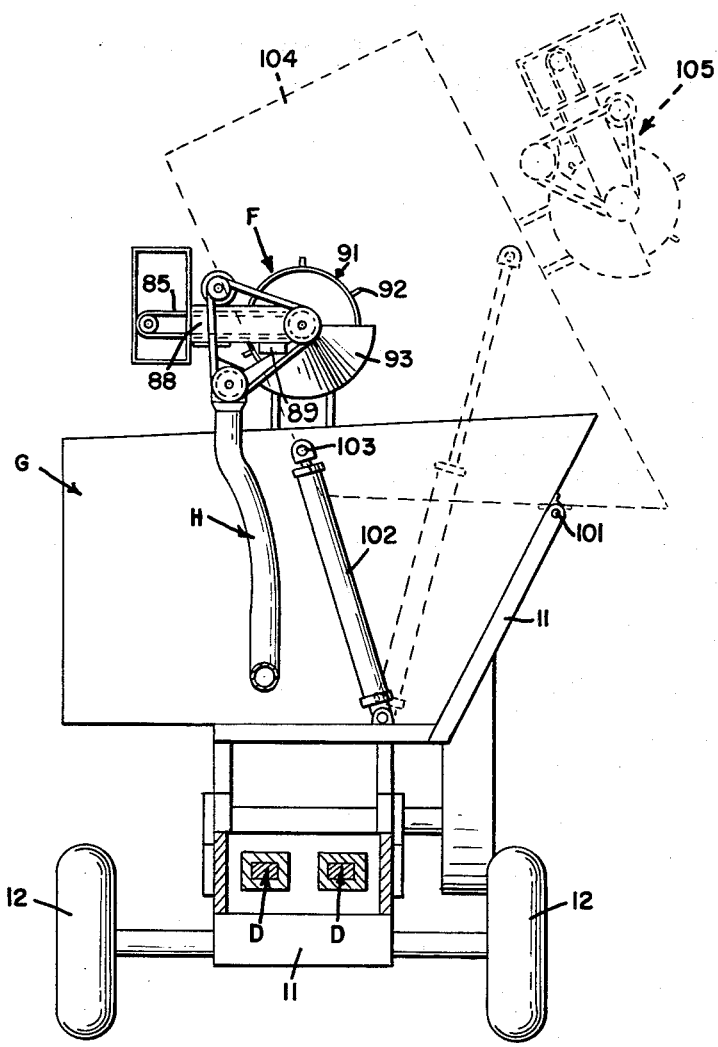
FIG. 7 is a section taken along line 7—7 of FIG. 2 with the discharge portion of the storage bin and fine removal apparatus of the present invention illustrated by dotted lines.

In normal operations, an open bed truck is pulled along side the pelletizing apparatus (to the right side of the pelletizing apparatus as illustrated in FIG. 7) and the storage bin and removal apparatus F pivoted about point 101 to allow the pellets to flow out of the bin and into the truck. The bin is thereafter returned to its normal position and the pelletizing operation continues.

Particularly with respect to the removal apparatus, a complete showing of means by which power from the power source 13 is connected to the removal apparatus F is not illustrated although it should be apparent that appropriate interconnections for purposes of rotating the necessary elements may be provided and that no such mechanical interconnecting driving means per se form any part of the invention.

While the pelletizing apparatus of the present invention has been exemplarily illustrated by a preferred embodiment, it should be apparent to those skilled in the art that changes and modifications may be made in the basic unit without departing from the spirit and scope of the invention. For this reason the present invention should be limited in no way except to the extent of the appended claims.

What is claimed is:

1. A pelletizing machine, comprising, in combination, a guide housing having first and second opposite ends, a ram slidably supported in said housing for reciprocation on compression and retracting strokes respectively toward and away from said first end, means for reciprocating the ram, a die formed with a die opening having an inlet end that registers with said first end of the ram housing and an outlet end remote from said inlet end, said die having a separator blade therein extending between said inlet and outlet ends to partition said opening into a plurality of cavities, said blade being tapered along opposite sides from said inlet end to said outlet end whereby each cavity is of larger cross-sectional size at said outlet end than at said inlet end, and means for placing charges of hay within said housing whereby the hay is compressed and forced through said cavities to form dense pellets.

2. A pelletizing machine in accordance with claim 1 wherein the interior surfaces of said cavities and the surfaces of said blade are plated with a coating of chromium.

3. A pelletizing machine in accordance with claim 1 wherein the interior surfaces of said cavities are plated with a smooth, hard, low-friction metal.

4. In pelletizing apparatus, means for removing fines and pellets having metallic objects embedded therein comprising, in combination, a frame, an endless belt conveyor having input and discharge ends supported in a housing attached to said frame, said discharge end having a magnetic support roller for said conveyor belt, an open ended drum having a circumferential wire mesh surface rotatably supported adjacent the discharge end of belt conveyor, a partial conically shaped open screen member affixed to said frame and having its discharge end extending interior of said rotatable drum and with its other end lying beneath the discharge end of said belt conveyor, a partial cylindrical housing affixed to said frame adjacent the discharge end of said belt conveyor and beneath said drum to cooperate with said drum, means connected to one side of said housing to return fines filtering through said drum and said conical member overlying said housing to the pelletizing apparatus, a plurality of longitudinally oriented blades peripherally spaced apart on the surface of said drum to contact the interior surface of said housing to move fines to said fine return means, a storage bin underlying the discharge end of said drum, a discharge chute communicating with the lower side of said belt conveyor housing, and means cooperating with said pelletizing apparatus for delivering pellets to the input end on said endless belt conveyor whereby pellets that are free of metallic objects move through said conical screen and said drum to said storage bin and pellets having metallic objects embedded therein continue around the magnetic bearing member to be discharged through said discharge chute.

5. Apparatus for pelletizing hay, oats, alfalfa and similar natural forage comprising, in combination, a guide housing having a longitudinal axis, a ram, a double in-line linkage supporting said ram for reciprocating movement in said guide housing along said longitudinal axis, means for reciprocating said ram at a high stroke rate, a hollow die housing connected to one end of said guide housing said die housing constructed internally to form a head space immediately adjacent said guide housing and a plurality of die cavities substantially parallel to said longitudinal axis, a decreasing tapered auger housing attached to said guide housing and communicating with the interior thereof to the rear of said head space, a tapered shank auger mounted for rotation in said auger housing to convey forage products positively to said guide housing under initial compression, and means for conveying forage products to said auger housing.

6. Apparatus for forming dense pellets of natural forage comprising, in combination, a frame mounted on wheels for movement through a field of cut forage, an auger rotatably supported on said frame, an auger housing enclosing said auger and having an input opening adjacent the upper part of the auger and a discharge opening adjacent the lower end of said auger, means for picking up natural forage from a field and conveying it adjacent the input of said auger housing, said pick up and conveying means including a finger drum supported for rotation about a vertical axis adjacent to the input of said auger, a ram supported adjacent to the discharge end of said auger for reciprocating movement, a housing enclosing said ram, means for reciprocating said ram so that successive charges of forage from said auger are compacted against preceding charges in said housing, a multi-cellular die cavity supported on said frame ahead of said ram housing to further compress the charges of forage compacted by said ram and to split the charges into a plurality of small size pellets, conveying means affixed to said frame and having an input adjacent to the discharge end of said die cavity and a discharge end remote therefrom, a storage bin pivotally supported on said frame in juxtaposition to the discharge end of said conveying means, fine and trash iron removal apparatus having input and discharge ends affixed to said storage bin with its input side normally adjacent to the discharge end of said conveying means whereby the finished pellets are transferred by said conveying means to the input of said fine and trash iron removal apparatus, said fine and trash iron removal apparatus including means for segregating pellets having trash iron embedded therein and means for removing fines from the pellets and returning them to the input side of said auger for recompression, means operable to pivotally rotate said storage bin and fine removal apparatus to discharge pellets stored therein, and power means supported on said frame adapted to operate the components of the apparatus so that pellets are continuously formed as the pelletizing apparatus is moved through a field of cut forage.

7. Apparatus for forming dense pellets of natural forage comprising, in combination, compression means having a series of stages operable to form dense pellets of natural forage, a mobile frame supporting said compression means and operable to move the pellet forming apparatus through a field of cut forage, means for picking up and translating cut forage to said compression means in charges of preselected volume, storage means supported on said mobile apparatus, means operable to remove pellets having trash iron embedded therein and to segregate loose flakes of forage from the pellets, conveyor means for conveying formed pellets from the multi-stage compression means to said fine and trash iron removal apparatus, and means operable to discharge a supply of pellets stored in said storage bin.

8. Apparatus in accordance with claim 7 wherein said compression means includes a precompression auger, a reciprocating ram and a multi-cellular die cavity.

9. In mobile apparatus for transforming cut forage in a field into densely compacted pellets, the combination of multi-stage compression means supported on said apparatus and operable to successively compact charges of cut forage into dense compact pellets, means for picking up and translating forage from the field to said multi-stage compression means, and a vertically and rotatably supported drum having a plurality of horizontal fingers affixed peripherally thereto and extending radially therefrom for gathering selected amounts of said cut forage from said pick up and translating apparatus and directing it to the first stage of said multi-stage compression means, said multi-stage compression means including a rigid die cavity having a plurality of separator blades supported therein and means for forcing said forage through said die cavity to additionally compress and separate said compacted compressed mass of forage into a plurality of small sized pellets.

10. In mobile apparatus for transforming cut forage in a field into densely compacted pellets in accordance with claim 9 wherein said die cavity includes a plurality of liner plates which in connection with said separator blades form the interior surfaces of said die, which surfaces are plated with a thin layer of chromium to prevent seizure by the forage during and subsequent to operation of the apparatus.

11. In apparatus for forming dense pellets of natural forage, means for compacting the forage, including a die having a separator member supported therein, said separator member symmetrically tapered from the front to rear of said die between 2½ and 5 mils per foot of die length to reduce the tendency of the interior surfaces of the die to seize forage compacted therein and including a thin layer of chromium on all interior surfaces of said die including said separator member to, in combination with said tapered separator member, prevent seizure during and subsequent to operation of the pellet forming apparatus.

12. In apparatus for forming dense pellets of natural forage according to claim 11 wherein said separator member is on the order of fourteen inches long and is symmetrically tapered for at least eight inches of its rearmost length and the forwardmost edge of said separator member has a knife edge to divide the compacted hay as it is moved through said die.

13. Means for removing fines and pellets having metallic objects therein when natural forage is compressed into a series of small dense pellets comprising, in combination, a perforate drum supported for rotation about its axis, means for transporting pellets adjacent one end of said drum whereby said pellets free of metallic objects move through said drum and out the other end thereof, transmission means terminating adjacent said drum and the pelletizing apparatus respectively, means cooperating with said drum to collect fines falling through the perforations thereof and to discharge them into said transmission means, means responsive to the presence of metallic objects in certain ones of said pellets and associated with said transporting means to divert said metal containing pellets from said drum, and discharge means for discharging said metal embedded pellets after diversion.

14. Means in accordance with claim 13 wherein said transporting means is an endless belt conveyor, said transmission means includes an auger rotating in an open-sided housing and said metallic responsive means includes a magnetic support roller for said belt conveyor which causes the metal containing pellets to move around the end of the endless belt conveyor and along the lower side thereof to said discharge means.

15. A pelletizing machine, comprising die means including at least a pair of die cavities having inlet and outlet ends and separated by at least one separator member, means for introducing hay to the inlet ends of the cavities for extrusion through an exit at the outlet ends of said cavities, means cooperative with the die means for compacting hay in and for extruding hay through said cavities to emerge therefrom as dense pellets, and said separator member being tapered along its opposite sides between the inlet and outlet ends of the cavities to provide the outlet end of each cavity with a larger cross-section than its inlet end.

16. The invention defined in claim 15, wherein the member is on the order of fourteen inches long and the taper thereon is symmetrical at both sides thereof and is between 2½ and 5 mils per foot of die length of at least the last eight inches of said member and the interior surfaces of the cavities and said sides of said member have a thin coating of chromium of between 1 and 3 mil thickness thereon.

17. Apparatus for pelletizing hay, oats, alfalfa and similar natural forage comprising, in combination, a guide housing having a longitudinal axis, a ram supported for slidable reciprocating movement in said guide housing along said longitudinal axis, means for reciprocating said ram, an open-ended die housing connected to one end of said guide housing and including at least one longitudinal separator blade to divide the cavity into at least a pair of cavities substantially parallel to said longitudinal axis, means for conveying forage products to said guide housing ahead of said ram, and means for preventing compacted hay moving through said die housing from seizing the interior surfaces thereof, including symmetrical tapers on opposite sides of the separator blade between 2½ and 5 mils per foot of die length of at least the last half of the length of said blade and a thin coating of chromium of between 1 and 3 mil thickness on all interior surfaces of the die housing which contact the hay during the pelletizing operation.

18. In apparatus for forming dense pellets of natural forage, means for compacting the forage, including a die having at least one separator member supported therein, said separator member being symmetrically tapered at its opposite sides from the front to rear of said die between 2½ and 5 mils per foot of die length to reduce the tendency of the interior surfaces of the die to seize forage compacted therein.

19. In apparatus for forming dense pellets of natural fiber according to claim 18, wherein said separator member is on the order of fourteen inches in length and is symmetrically tapered at its opposite sides for at least eight inches of its rearmost length and the forwardmost edge of said separator member has a knife edge to divide the compacted hay as it is moved through said die.

References Cited by the Examiner

UNITED STATES PATENTS

| Number | Date | Name | Class |
|---|---|---|---|
| 55,565 | 6/1866 | Weissenborn. | |
| 657,607 | 9/1900 | Luzatto. | |
| 723,150 | 3/1903 | Fenn. | |
| 729,149 | 5/1903 | Fenn. | |
| 751,752 | 2/1904 | Pilliod. | |
| 826,007 | 7/1906 | Wurl | 99—8 |
| 1,572,629 | 2/1926 | Welton. | |
| 2,059,229 | 11/1936 | Gregg | 100—39 |
| 2,223,904 | 12/1940 | Zent et al. | 99—8 |
| 2,349,920 | 5/1944 | Welcome | 18—47 |
| 2,622,510 | 12/1952 | Letts | 100—98 |
| 2,716,318 | 8/1955 | Skromme | 56—1 |
| 2,942,916 | 6/1960 | Kosh | 99—8 |
| 3,006,272 | 10/1961 | Brady | 100—93 |
| 3,023,559 | 3/1962 | Richey et al. | 5—61 |
| 3,035,920 | 5/1962 | Knodt | 99—8 |
| 3,036,515 | 5/1962 | Nolt | 100—41 |
| 3,044,877 | 7/1962 | Lent | 99—8 |

FOREIGN PATENTS

| Number | Date | Country |
|---|---|---|
| 233,148 | 3/1961 | Australia. |

WALTER A. SCHEEL, *Primary Examiner.*

ANTONIO F. GUIDA, *Examiner.*